Oct. 12, 1937.                G. HACKEL                2,095,696
                            DRAINAGE DEVICE
                         Filed Sept. 3, 1935
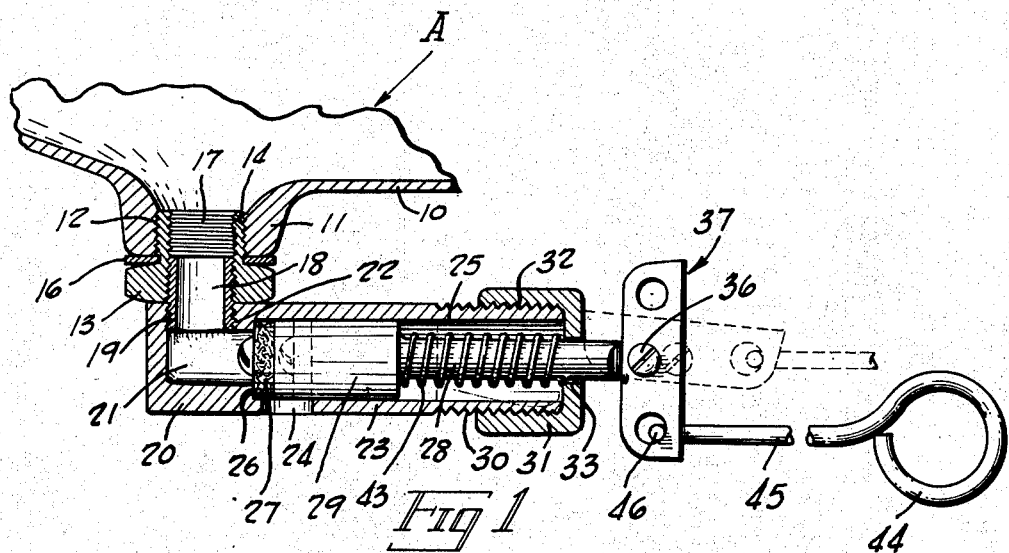
Fig 1
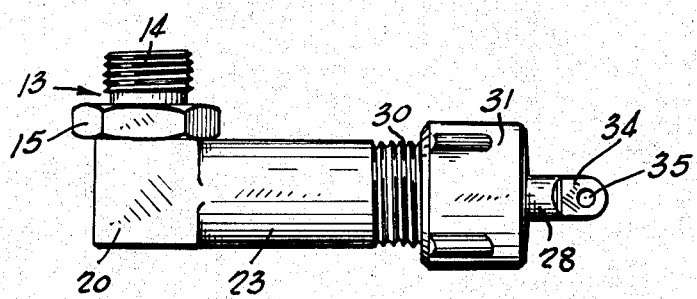
Fig 2
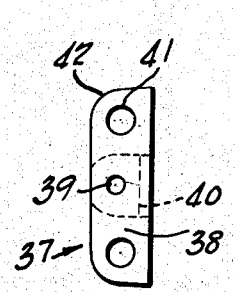     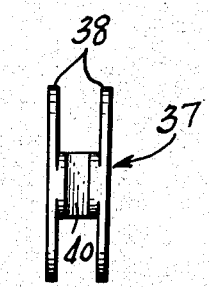
Fig 3          Fig 4
INVENTOR:
GEORGE HACKEL
BY
Joshua R H...
ATTORNEY Patented Oct. 12, 1937

2,095,696

UNITED STATES PATENT OFFICE 2,095,696

DRAINAGE DEVICE

George Hackel, Philadelphia, Pa.

Application September 3, 1935, Serial No. 38,877

2 Claims. (Cl. 137—34)

This invention relates to the art of drainage devices and is concerned particularly with the provision of a device intended for operative association with the crank case of an automobile for drainage purposes.

At the present time, considerable difficulty is experienced by those desirous of draining the crank cases of motor vehicles, such as for the purpose of changing the lubricating oil, in that it is necessary to stoop or crawl under the vehicle or generally assume an awkward position both to initiate the drainage by removing the plug and to again close up the opening through which the oil drains after drainage is completed.

There have been certain attempts made to provide devices of this character but they have proved generally unsatisfactory for various reasons. One type of device necessitates the holding of the valve open by the person draining the crank case for the entire time during which the oil flows through the valve. Other devices have proven not to afford the sealing effects desired when the valve is closed.

With the foregoing conditions in mind, this invention has in view, as an important object, the provision of a device intended for association with a crank case of a motor vehicle which may be operated by means of a hook to open a valve and maintain the valve in this open position for any desired length of time. In carrying this idea out in a practical embodiment, a housing is connected to a plug ordinarily included in the crank case of a motor vehicle, and there is an opening drilled in the plug. A valve is carried by the housing for establishing communication between the last mentioned opening and the opening made in the wall of the housing.

A particular object of the invention is to provide operating mechanism for the said valve which is effective to maintain the valve open against the influence of a spring which normally maintains the valve in sealing position.

Yet another detailed object of the invention is to provide, in a device of the character noted, a valve actuated by a plunger and with which plunger is associated an operating lever which is pivotally mounted thereon. The lever is designed for cooperation with the housing whereby, upon its being positioned in alignment with the plunger, movement of the plunger with respect to the housing in one direction is inhibited.

Another important object of the present invention is to provide a drainage device of the character noted which is adaptable for operative association with the plug of crank cases of various design.

The precepts of this invention may be followed out in providing a device for the purpose indicated regardless of whether the plug of a crank case is located on the bottom proper or at the bottom of the side edge. In other words, it makes no difference whether the opening closed by the plug is in a vertical or horizontal plane.

Other more detailed objects and advantages will in part become apparent and in part be hereinafter stated as the description of the invention proceeds.

The invention therefore comprises a housing which is conductively connected to the conventional plug of a crank case. An opening is formed in the wall of this housing, while the housing is also provided with a passageway communicating with the interior of the crank case. A valve member is movable into positions, either establishing communication between the opening in the wall of the housing in said passageway, or cutting off such communication.

This valve member is carried by a plunger which has an extremity projecting beyond the housing. An operating lever is pivotally carried by the plunger and has openings formed in each extremity, either of which is adapted to receive a hook. This lever is adapted to become aligned with the plunger, whereby the latter is maintained in a position in which the valve member is open. A release of the lever from this aligned position permits return of the valve to sealing position under the influence of a spring located about the plunger.

For a full and more complete understanding of the invention, reference may be had to the following description and accompanying drawing, wherein:

Figure 1 is a side view, partly in section and partly in elevation, of a portion of a crank case and plunger, with a drainage device, made in accordance with the precepts of this invention, associated therewith, Figure 2 is a view in side elevation of the drainage device per se, Figure 3 is a detailed showing in side elevation of the operating lever for the plunger, and Figure 4 is another detailed showing in end elevation of this operating lever.

Referring now to the drawing, wherein like reference characters denote corresponding parts, a portion of a crank case of a motor vehicle is referred to generally by the reference character A. This crank case includes a bottom wall 10 which ordinarily is provided with a thickened portion at 11 which is formed with a threaded opening 12. A plug designated 13 is provided with an exteriorly threaded cylindrical portion 14 that is screwed into the threaded opening 12. This plug 13 may be provided with wrench engaging means in the form of a hexagonal portion designated 15.

As shown in Figure 1, a gasket 16 may be interposed between the plug 13 and the thickened wall portion 11. The plug 13 is formed with a central passageway that is interiorly threaded as indicated at 17 and threaded in this passageway is a nipple 18. Upon reference to Figure 1, it will be noted that the nipple 18 has a portion 19 which projects below the head of the plug 13.

A housing designated 20 is formed with an angular passageway 21, the upper portion of which is interiorly threaded as at 22 and this interiorly threaded portion receives the portion 19 of the nipple 18. Projecting from one side of the housing 20 is a cylindrical extension 23 which may be integral with the housing and adjacent the point of communication between the cylindrical extension 23 and the housing 20. The former is formed with an opening 24 in the bottom of the outer wall thereof. The cylindrical extension 23 is defined on its interior by a cylindrical passageway 25 that is of a larger diameter than the passageway 21 in the housing 20. This difference in the diametrical dimensions of the passageways 21 and 25 is accommodated by a shoulder at 26.

Normally seated on the shoulder 26 is a valve member 27 which may take the form of any well-known type of disc valve, such as that made of a suitable fibrous composition. The valve member 27 is carried by a plunger 28 and backing for the valve member 27 is included in the construction in the form of a piston 29 that is also carried by the plunger 28. The piston 29, together with the valve member, is slidable in the cylindrical passageway 25 to move the valve member 27 into a position establishing communication between the opening 24 and passageway 21, or to a position abutting the shoulder 26, in which case such communication is cut off.

At its free extremity, the cylindrical extension 23 is exteriorly threaded as at 30 and screwed to this threaded portion 30 is an end closure in the form of a cap 31 having an interiorly threaded skirt 32 that cooperates with the threads 28. The cap 31 is formed with an opening 33 through which the plunger 28 extends. Upon reference to Figure 2, it will be noted that the extremity of the plunger 28 is flattened, as shown at 34, and this flattened portion is provided with an opening 35. Pivotally mounted on this flattened portion 34 by a pin 36 which extends through the opening 35 is a lever designated generally by the reference character 37 and shown in detail in Figures 3 and 4. The lever 37 consists of spaced arms 38, each of which is formed with an opening 39 that receives the pin 36.

The arms 38 are connected by a bridge 40. At each end, each of the arms 38 is formed with an opening 41 and it is notable that the openings 41, on each end of the respective arms, are in substantial alignment. Upon reference to Figures 1 and 3, it will be noted that the extremities of the arms 38 are rounded-off at one side as indicated at 42, whereby they are constituted cam-like surfaces which cooperate with the cap member 31.

Disposed within the cylindrical extension 33 and about the plunger 28 is a coil spring 43 which abuts at one end the cap 31 and at the other end, the piston 29. This spring 43 normally urges the valve 27 against the shoulder 26.

Under ordinary conditions, the effect of the spring 43 is to maintain the valve member 27 in sealing position whereby the oil is maintained in the crank case A. Should a person be desirous of draining the oil from the crank case A, this drainage may be effected by the use of some tool having a fairly long arm and a hook at the end thereof.

Such a tool is shown in Figure 1 as comprising a handle member 44 attached to an arm 45 that at one end is formed with a hook 46. The hook 46 may be inserted in the openings 41 at either end of the lever 37 so upon a pull being exerted on the hooked tool, the lever 37 will be turned on the pin 36 whereupon the cam surface 42 at the end opposite to the end which is engaged by the hook will ride on the exterior surface of the cap 31 with the result that the plunger 28 will be urged outwardly against the influence of the spring 43 to unseat the valve member 27 from the valve 26 to establish communication between the opening 24 and passageway 21. When the lever 37 assumes a position in which it is in substantial alignment with the plunger 28, as shown by dotted lines in Figure 1, the plunger will be maintained in its extended position.

The operator may now release the handle 24 and the valve will remain open to permit of complete drainage of the oil from the crank case A. When it is desired to close the valve, this may be easily effected by exerting a slight pull on the handle 44 to disengage the cam surface 42 from the cap 31, whereupon a quick release or jar of the lever 37 will permit the spring 43 to move the plunger inwardly into a position with the valve 27 seated against the shoulder 26.

While a preferred specific embodiment of the invention is hereinbefore set forth, it is to be understood that I am not to be limited to the exact constructions illustrated and described because various modifications of these details may be provided in putting the invention into practice without the purview of the appended claims.

I claim:—

1. In combination, a housing having a passageway, an opening at one side thereof, a nipple threaded in said opening, a cylindrical hollow extension at another side of the housing in communication with the passageway, said extension having an opening in the wall thereof, an end closure for the said extension, a plunger in said extension having one end extending through an opening in the end closure and carrying at its other extremity a valve member which is movable into a position closing the passageway in the housing, a spring in the extension normally maintaining the valve member in a passageway closing position, and a lever pivotally carried by the free end of the plunger and having an opening in each end thereof adapted to receive a hook, said lever being formed with a cam surface at each end adapted to engage the exterior surface of the end closure.

2. A drainage device of the character described comprising a housing having a passageway therein, and a hollow extension at one side thereof, said extension having an opening in the wall thereof which is in communication with the passageway in the housing, a valve member in the extension movable into position establishing such communication or cutting-off the communication, means yieldably maintaining the valve member in a position cutting-off said communication, a cam pivotally mounted on the valve member to move the valve member against the influence of said yielding means to establish said communication, said cam also constituting a means for maintaining the valve member in this position establishing communication, and means for detachably connecting an operating link to the said cam.

GEORGE HACKEL.